United States Patent
Spry et al.

(10) Patent No.: US 8,341,457 B2
(45) Date of Patent: Dec. 25, 2012

(54) SYSTEM AND METHOD FOR OPTIMIZING REDUNDANCY RESTORATION IN DISTRIBUTED DATA LAYOUT ENVIRONMENTS

(75) Inventors: Andrew J. Spry, Wichita, KS (US); Kevin Kidney, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/721,712

(22) Filed: Mar. 11, 2010

(65) Prior Publication Data
US 2011/0225453 A1 Sep. 15, 2011

(51) Int. Cl.
G06F 11/00 (2006.01)
(52) U.S. Cl. .......... 714/6.22; 714/6.2; 714/6.21; 714/15
(58) Field of Classification Search ................ 714/6.2, 714/6.15, 6.21, 6.22
See application file for complete search history.

(56) References Cited

U.S. PATENT DOCUMENTS

| | | | |
|---|---|---|---|
| 5,754,756 A * | 5/1998 | Watanabe et al. ............ 714/6.21 |
| 6,067,636 A * | 5/2000 | Yao et al. ...................... 714/15 |
| 6,145,028 A * | 11/2000 | Shank et al. .................. 710/31 |
| 6,516,425 B1 | 2/2003 | Belhadj et al. | |
| 6,625,748 B1 | 9/2003 | Tanaka et al. | |
| 6,871,263 B2 * | 3/2005 | Dandrea ...................... 711/114 |
| 6,871,271 B2 * | 3/2005 | Ohran et al. .................. 711/162 |
| 7,149,919 B2 * | 12/2006 | Cochran et al. .............. 714/4.4 |
| 7,167,963 B2 * | 1/2007 | Hirakawa et al. ............. 711/162 |
| 7,433,948 B2 * | 10/2008 | Edsall et al. .................. 709/224 |
| 7,437,507 B2 * | 10/2008 | Sharma et al. ................ 711/114 |
| 7,457,929 B2 * | 11/2008 | Kasako ......................... 711/162 |
| 7,548,975 B2 * | 6/2009 | Kumar et al. ................. 709/226 |
| 7,788,532 B2 * | 8/2010 | Kawamura ..................... 714/15 |
| 7,877,545 B2 * | 1/2011 | Sharma et al. ................ 711/114 |
| 7,917,805 B2 * | 3/2011 | Ninose et al. ................ 714/6.13 |
| 8,015,439 B2 * | 9/2011 | Mukker et al. ............... 714/6.22 |
| 2003/0131182 A1 * | 7/2003 | Kumar et al. ................... 711/5 |
| 2003/0172149 A1 * | 9/2003 | Edsall et al. .................. 709/224 |
| 2003/0177324 A1 * | 9/2003 | Timpanaro-Perrotta ....... 711/162 |
| 2006/0212748 A1 * | 9/2006 | Mochizuki et al. .............. 714/6 |
| 2006/0218433 A1 | 9/2006 | Williams | |
| 2006/0277361 A1 * | 12/2006 | Sharma et al. ................ 711/114 |
| 2007/0094464 A1 * | 4/2007 | Sharma et al. ................ 711/162 |
| 2007/0094465 A1 * | 4/2007 | Sharma et al. ................ 711/162 |
| 2007/0094466 A1 * | 4/2007 | Sharma et al. ................ 711/162 |
| 2008/0091741 A1 * | 4/2008 | Zohar et al. .................. 707/202 |
| 2008/0126844 A1 * | 5/2008 | Morita et al. .................... 714/6 |
| 2008/0320134 A1 * | 12/2008 | Edsall et al. .................. 709/224 |
| 2009/0006746 A1 * | 1/2009 | Sharma et al. ................ 711/114 |
| 2009/0125680 A1 * | 5/2009 | Ninose et al. ................. 711/114 |
| 2009/0228651 A1 * | 9/2009 | Sharma et al. ................ 711/114 |
| 2009/0259816 A1 * | 10/2009 | Sharma et al. ................ 711/162 |
| 2009/0259817 A1 * | 10/2009 | Sharma et al. ................ 711/162 |
| 2010/0115332 A1 * | 5/2010 | Zheng et al. ..................... 714/6 |
| 2011/0066803 A1 * | 3/2011 | Arakawa et al. .............. 711/114 |
| 2011/0099328 A1 * | 4/2011 | Gensler et al. ................ 711/111 |
| 2011/0167294 A1 * | 7/2011 | Ninose et al. ................ 714/6.22 |

* cited by examiner

*Primary Examiner* — Joshua P Lottich
(74) *Attorney, Agent, or Firm* — Suiter Swantz pc llo

(57) ABSTRACT

The present disclosure is directed to a system and a method for optimizing redundancy restoration in distributed data layout environments. The system may include a plurality of storage devices configured for providing data storage. The system may include a prioritization module communicatively coupled to the plurality of storage devices. The prioritization module may be configured for determining a restoration order of at least a first data portion and a second data portion when a critical data failure occurs. The system may include a restoration module communicatively coupled to the plurality of storage devices and the prioritization module, the restoration module configured for restoring at least the first data portion and the second data portion based upon the restoration order.

8 Claims, 9 Drawing Sheets

SYSTEM AND METHOD FOR OPTIMIZING REDUNDANCY RESTORATION IN DISTRIBUTED DATA LAYOUT ENVIRONMENTS

TECHNICAL FIELD

The present disclosure generally relates to the field of distributed storage devices, and more particularly to a system and a method for optimizing redundancy restoration in distributed data layout environments.

BACKGROUND

Storage devices, such as RAID mirror architectures, allow data to stored and protected from potential data loss. However, if multiple storage devices fail in the same architecture, the data may potentially be lost before the storage architecture has a chance to rebuild or restore the data.

SUMMARY

Accordingly, an embodiment of the present disclosure describes a system for restoring data stored on a plurality of storage devices. The system may include a plurality of storage devices configured for providing data storage. The system may include a prioritization module communicatively coupled to the plurality of storage devices. The prioritization module may be configured for determining a restoration order of at least a first data portion and a second data portion when a critical data failure occurs. The system may include a restoration module coupled to the plurality of storage devices and the prioritization module, the restoration module configured for restoring at least the first data portion and the second data portion based upon the restoration order.

The present disclosure also describes a method for restoring data stored on a plurality of storage devices. The method may include analyzing a storage device failure occurring on at least one storage device, the at least one storage device included with a plurality of storage devices configured for providing data storage for at least a first data portion and a second data portion. The method may include determining a restoration order of at least the first data portion and the second data portion when a critical data failure has occurred. The method may include restoring at least the first data portion and the second data portion based upon the restoration order.

The present disclosure describes a computer-readable medium having computer-executable instructions for performing a method of restoring data stored on a plurality of storage devices. The method may include mapping at least a first virtual data chunk to a first storage device and a second virtual data chunk to a second storage device, the first storage device and the second storage device contained within a plurality of storage devices, the first virtual data chunk associated with a first virtual data slice and the second virtual data chunk associated with a second virtual data slice. The method may include detecting a failure of the first storage device. The method may include determining whether a zero drive redundancy event occurred on the first virtual data slice. The method may include restoring the first virtual data chunk to a first replacement storage device before the second virtual data chunk is restored to a second replacement storage device when the zero redundancy event occurred on the first virtual data slice.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
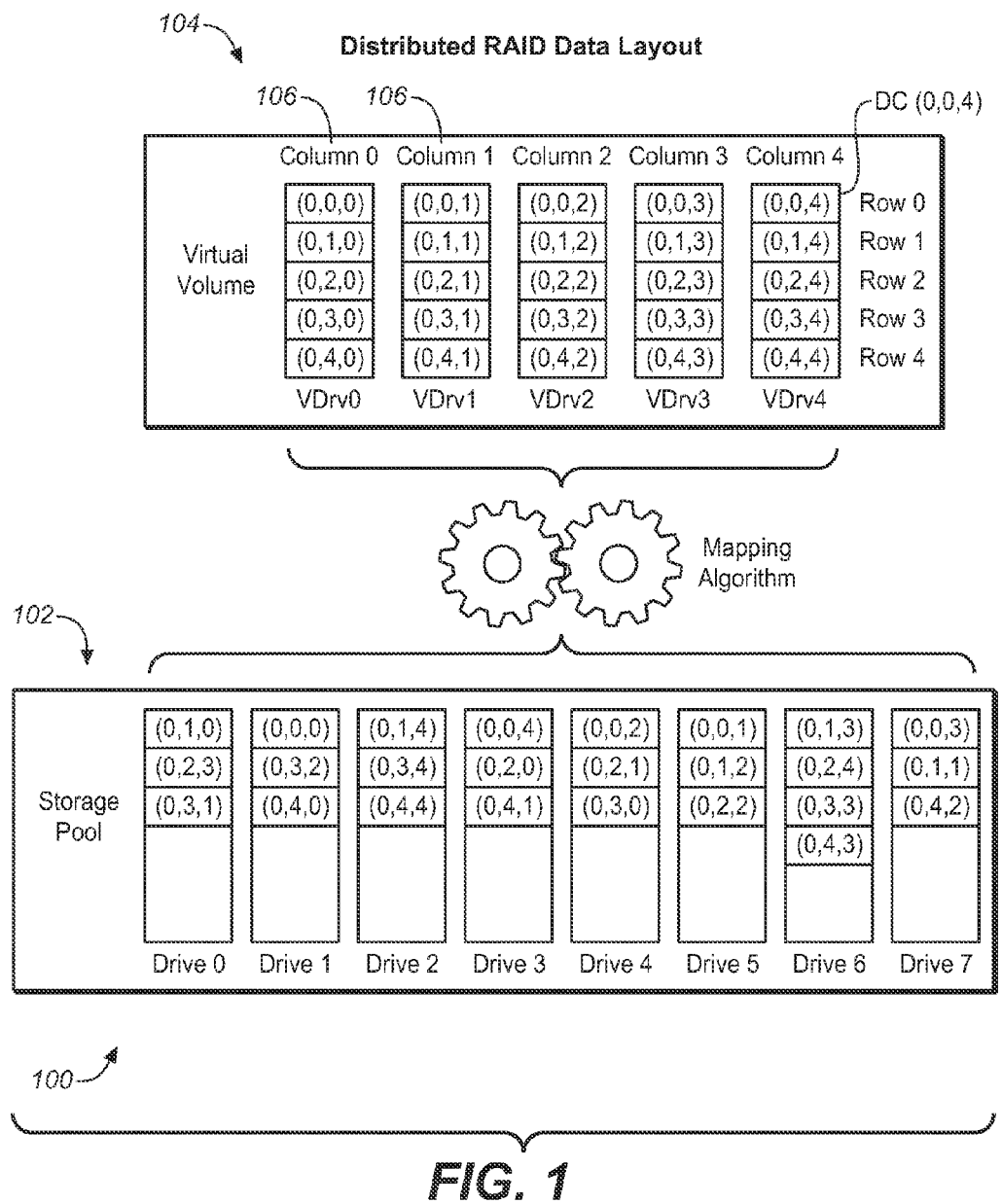
FIG. 1 is an exemplary embodiment of a distributed RAID (redundant array of inexpensive disks) Data Layout.

Reference will now be made in detail to the subject matter disclosed, which is illustrated in the accompanying drawings.

Referring generally to FIGS. 1-9, the present disclosure is directed to a system 100 for optimizing redundancy restoration in distributed layout environments. The system 100 may include a plurality of storage of storage devices 102 (shown in FIG. 1 as Drv0, Drv1, Drv2, Drv3, Drv4, Drv5, Drv6 and Drv7) for storing data. Each storage device 102 may be a physically separated storage device. For example, the plurality of storage devices 102 may all be contained in the same storage system. Conversely, each storage device 102 may be positioned at a location different than the other storage devices 102. Furthermore, some storage devices 102 may be at one geographical location while the other storage devices 102 may be located at other geographical locations. The plurality of storage devices 102 may be a RAID (redundant array of inexpensive disks) configuration. Each storage device 102 may be communicatively coupled to other storage devices 102.

The system 100 may include a virtual volume 104 (i.e. storage virtualization) formed by the plurality of storage devices 102. The virtual volume 104 may provide a computing device access to data in the virtual volume 104. The virtual volume 104 may be a virtual disk RAID set 104. The virtual volume 104 may include a plurality of virtual drives 106 (shown in FIG. 1 as VDrv0, VDrv1, VDrv2, VDrv3, and VDrv4). The virtual volume may store data as data words or data slices across the virtual drives 106. The data word size or data slice size may be set by system 100. For example, a single data slice may be referred to as the data portions spanning Row 0 (e.g. Data Chunk (DC) (0,0,0), DC (0,0,1), DC (0,0,2), DC (0,0,3), DC (0,0,4)). Each data portion (e.g. DC (0,0,0), DC (0,0,1), etc.) may be referred to as a data chunk. The data chunk may be identified by volume, column, and row indices. The data chunk size may be equal to the RAID stripe stored on one virtual disk (i.e. the size of DC (0,0,0)). Hereinafter, the term data may be referred to as data slice, and the term data portion may be referred to as data chunk.

As illustrated in FIG. 1, the plurality of storage devices 102 outnumbers the number of virtual drives 106 in the virtual volume 104. This may allow the data chunks to be sparsely distributed across the plurality of storage devices 102, which may allow for optimized redundancy restoration.

Figure 2A:
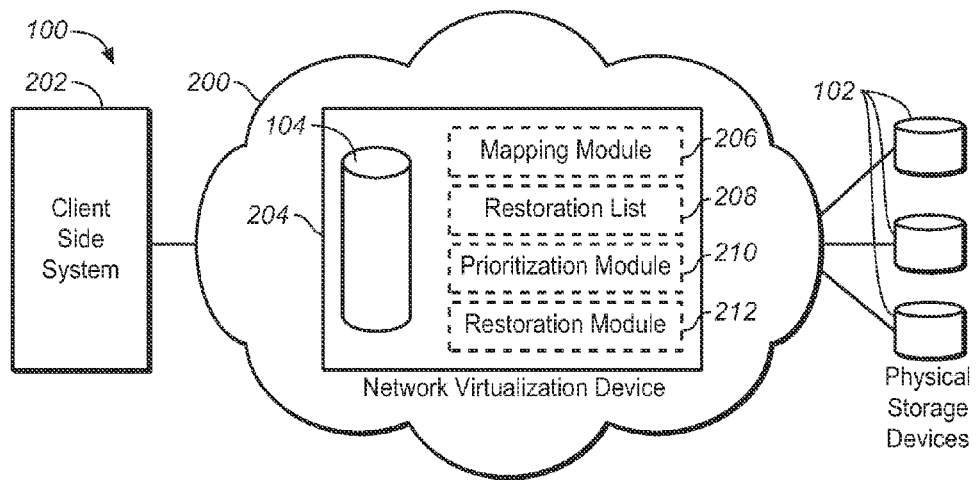
FIG. 2A is a block diagram illustrating an embodiment of a system for optimizing redundancy restoration in distributed data layout environments.

FIG. 2A, depicts a possible embodiment of the system 100. A client side system 202 may communicate with the virtual volume 104. The virtual volume 104 may communicate with the network virtualization device 204. The network virtualization device may reside in a storage area network 200. The network virtualization device 204 may communicate with the plurality of devices 102. A mapping algorithm may provide a virtual volume addressing scheme, which may allow the data chunks to be mapped from the virtual volume 104 to the plurality of storage devices 102 based on the virtual volume addressing scheme. The mapping algorithm may be incorporated into a mapping program or module 206. The mapping algorithm may determine the storage device 102 that stores each data chunk. It is contemplated that the mapping algorithm may be any algorithm as long as the algorithm is repeatable and only maps at most one data chunk from a data slice to the same storage device 102.

The system 100 may include a restoration list 208 or restoration queue 208 of references to data chunks that need to be rebuilt to achieve full redundancy. The restoration list 208 may be communicatively coupled to the plurality of storage devices 102 and the virtual volume 104. The references may include pointers or the like. Upon a storage device 102 failing, a new restoration list 208 may be created listing the references to each data chunk that needs to be restored from the failed storage device 102. Specifically, the restoration list 208 may be created by copying from metadata a list of references to data chunks stored on the failed storage device 102. Alternatively, the restoration list 208 may be created by running the mapping algorithm on the virtual volume 104 to determine which data chunks were stored on the failed storage device 102 and creating a list of references to the data chunks based upon this determination. The restoration list 208 may reside on the network virtualization device 204.

The system 100 may include a prioritization module 210 communicatively coupled to the plurality of storage devices 102 and the virtual volume 104. The prioritization module 210 may determine a restoration order of the data chunks based upon a critical data failure. A critical data failure may be referred hereinafter as a critical slice failure. A critical slice failure may occur when a data slice is at risk of being lost upon another storage device 102 failing. A critical slice failure may also be referred to as zero drive redundancy.

Figure 3:
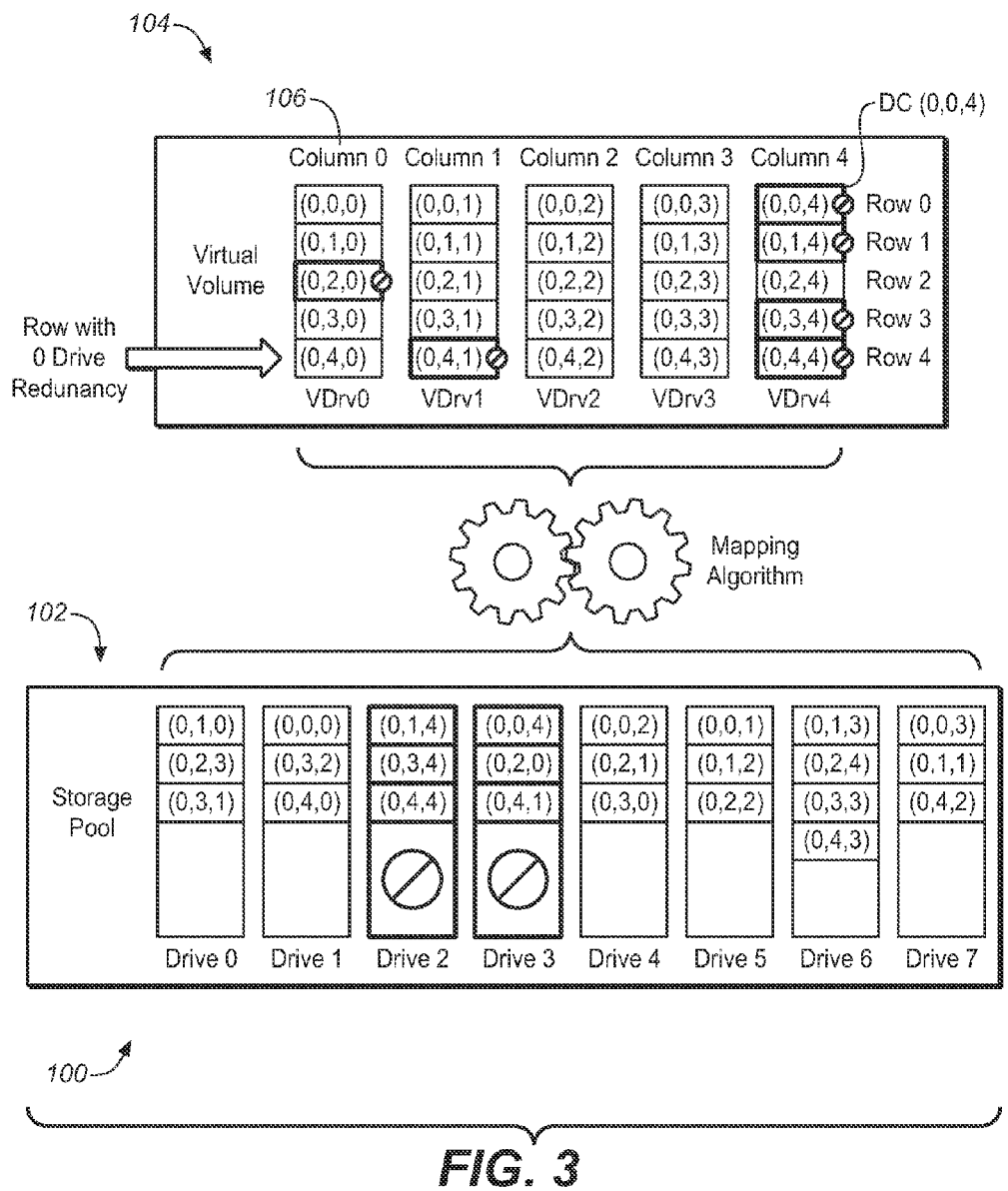
FIG. 3 is an exemplary embodiment of a distributed RAID (redundant array of inexpensive disks) Data Layout as illustrated in FIG. 1 depicting two storage device failures.

An example of a critical slice failure, or zero drive redundancy, is depicted in FIG. 3. A data slice, as depicted in the current embodiment, can sustain two data chunk losses before the data slice is lost. The lost data chunks may be reconstructed or rebuilt through various RAID techniques, such as parity and/or striping in a RAID 6 configuration. FIG. 3 depicts a situation where storage devices Drv2 and Drv3 have failed. The data chunks stored on storage devices Drv2 and Drv3 have been lost. Each data chunk from storage devices Drv2 and Drv3 must be reconstructed before full redundancy has been restored. A restoration list 208 may be created listing references to the data chunks from storage devices Drv2 and Drv3 to be restored. The data slice of row 4 may be at risk of a data loss. For instance, if another storage device 102 fails, the data slice of row 4 may be lost or destroyed due to the inability to reconstruct the lost data chunks contained in row 4. This type of situation is termed a critical slice failure or zero drive redundancy. The prioritization module 210 may amend the restoration list 208 by placing either a reference to DC (0,4,1) or a reference to DC (0,4,4), or both a reference to DC (0,4,1) and a reference to DC (0,4,4), at the top of the restoration list 208. The reference to DC (0,4,1) may be placed ahead of the reference to DC (0,4,4) in the restoration list 208 due to the reference to DC (0,4,1) having an earlier column identifier. One skilled in the art will recognize that only one of DC (0,4,1) or DC (0,4,4) has to be rebuilt to restore single drive redundancy The data chunks, DC (0,4,1) or DC (0,4,4), may be rebuilt to a replacement storage drive.

Referring generally to FIG. 2A, the system 100 may include a restoration module 212 communicatively coupled to the plurality of storage devices 102 and the prioritization module 210. The restoration module 212 may restore a data chunk and a different data chunk to a replacement storage device based upon the restoration order. The replacement storage device may be a storage device within the plurality of storage devices 102. Restored data chunks may be mapped onto the storage system or storage pool using the same mapping algorithm since the mapping algorithm may be aware of the missing or failed storage devices 102.

Figure 2B:
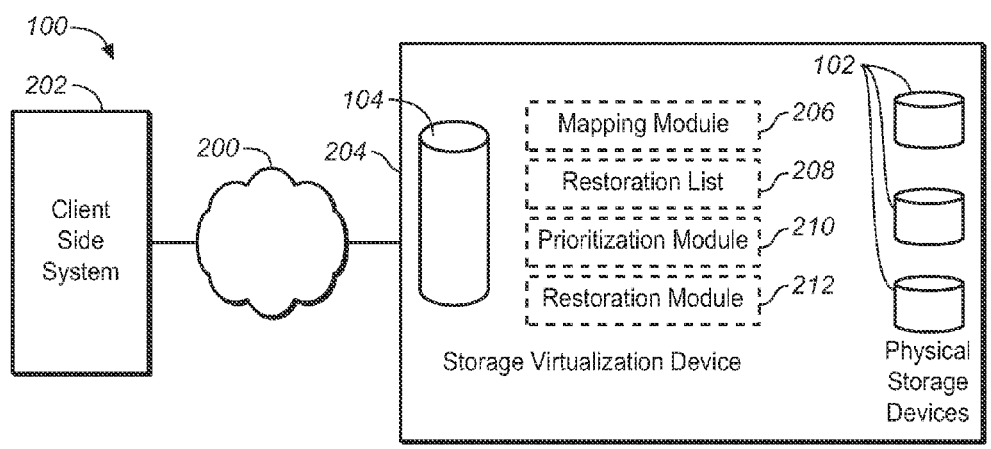
FIG. 2B is a block diagram illustrating an alternative embodiment of a system for optimizing redundancy restoration in distributed data layout environments.

An alternative embodiment of system 100 is depicted in FIG. 2B. A client side system 202 may communicate with a storage area network 200. The storage area network 200 may communicate with a storage virtualization device 204. A plurality of storage devices 102, a virtual volume 104, a mapping module 206, a restoration list 208, a prioritization module 210, and a restoration module 212 may reside on the storage virtualization device 204.

The storage area network 200 may further communicate with a virtual volume 104. The virtual volume 104 may communicate with a mapping algorithm. The mapping algorithm may communicate with the plurality of storage devices 102. The mapping algorithm may provide a virtual volume addressing scheme, which may allow the data chunks to be mapped from the virtual volume 104 to the plurality of storage devices 102 based on the virtual volume addressing scheme.

The prioritization module 210 and/or the restoration module 212 may be implemented as a set of computer readable code executable on a computer readable medium. The prioritization module 210 and/or the restoration module 212 may also be implemented as firmware. The prioritization module 210 and/or the restoration module 212 may also be implemented as hardware.

Referring generally to FIG. 3, the restoration module 212 may rebuild DC (0,4,1) or DC (0,4,4) ahead of any other referenced data chunk because the reference to DC (0,4,1) or the reference to DC (0,4,4) was placed higher on the restoration list 208 by the prioritization module 210. Once one of these data chunks is rebuilt, the restoration module 212 may continue rebuilding any other data chunks that were referenced on the restoration list 208. Once a data chunk is rebuilt, the reference to that data chunk will be removed from the restoration list 208.

Figure 4:
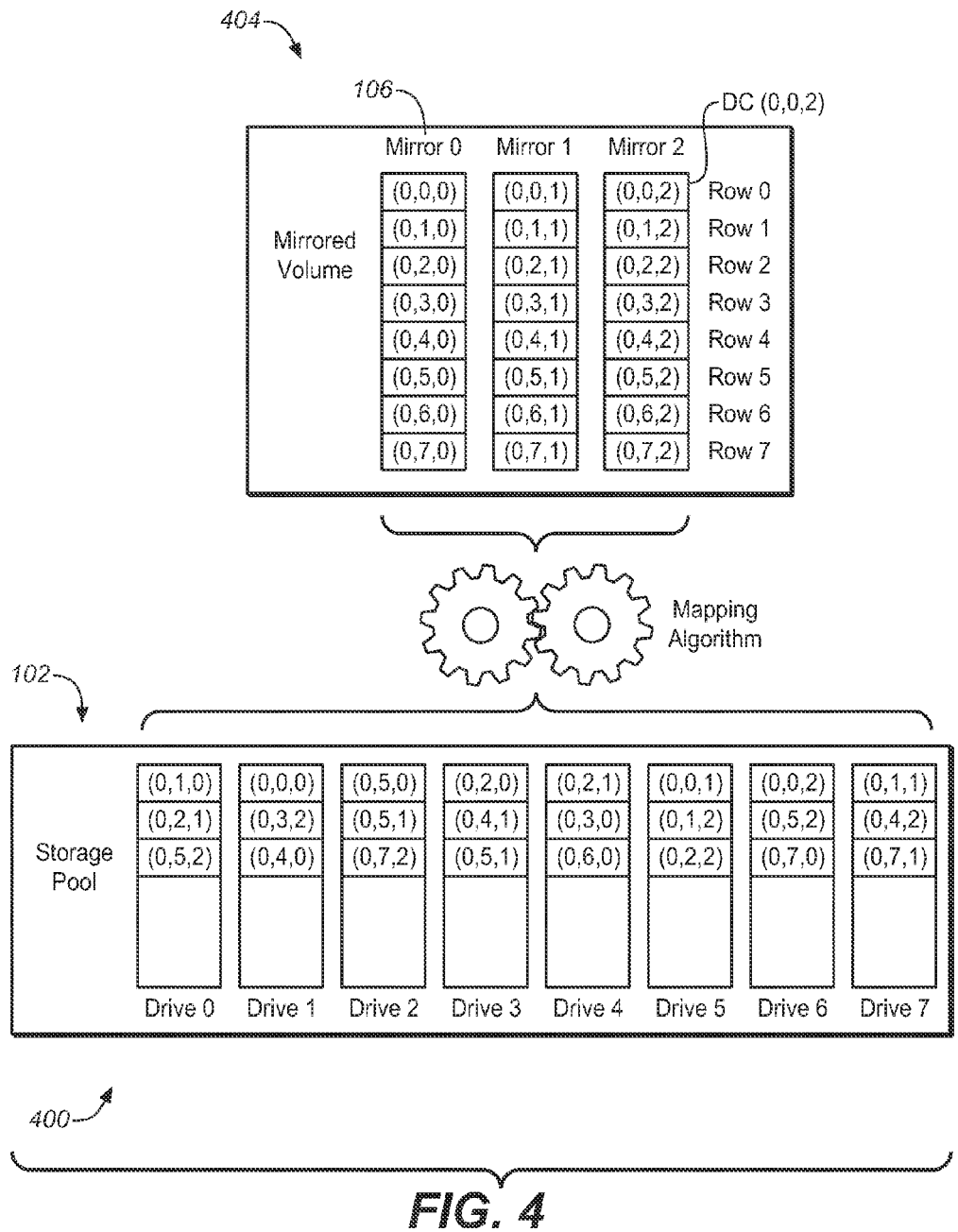
FIG. 4 is an exemplary embodiment of a Distributed Mirror Data Layout.

Generally referring to FIG. 4, a specific embodiment of system 100 is depicted. The system 100 may be implemented as a distributed mirror architecture 400. The mirrored virtual volume 404 may include multiple data chunks (e.g. DC (0,0,0), DC (0,0,1), etc.). The mirrored virtual volume 404 may be a virtual volume 104. The multiple data chunks may be mapped to a plurality of storage devices 102 (shown in FIG. 4 as Drv0, Drv1, Drv2, Drv3, Drv4, Drv5, Drv6 and Drv7) via the mapping algorithm. The mapping algorithm may be incorporated into a mapping module 206.

Figure 5:
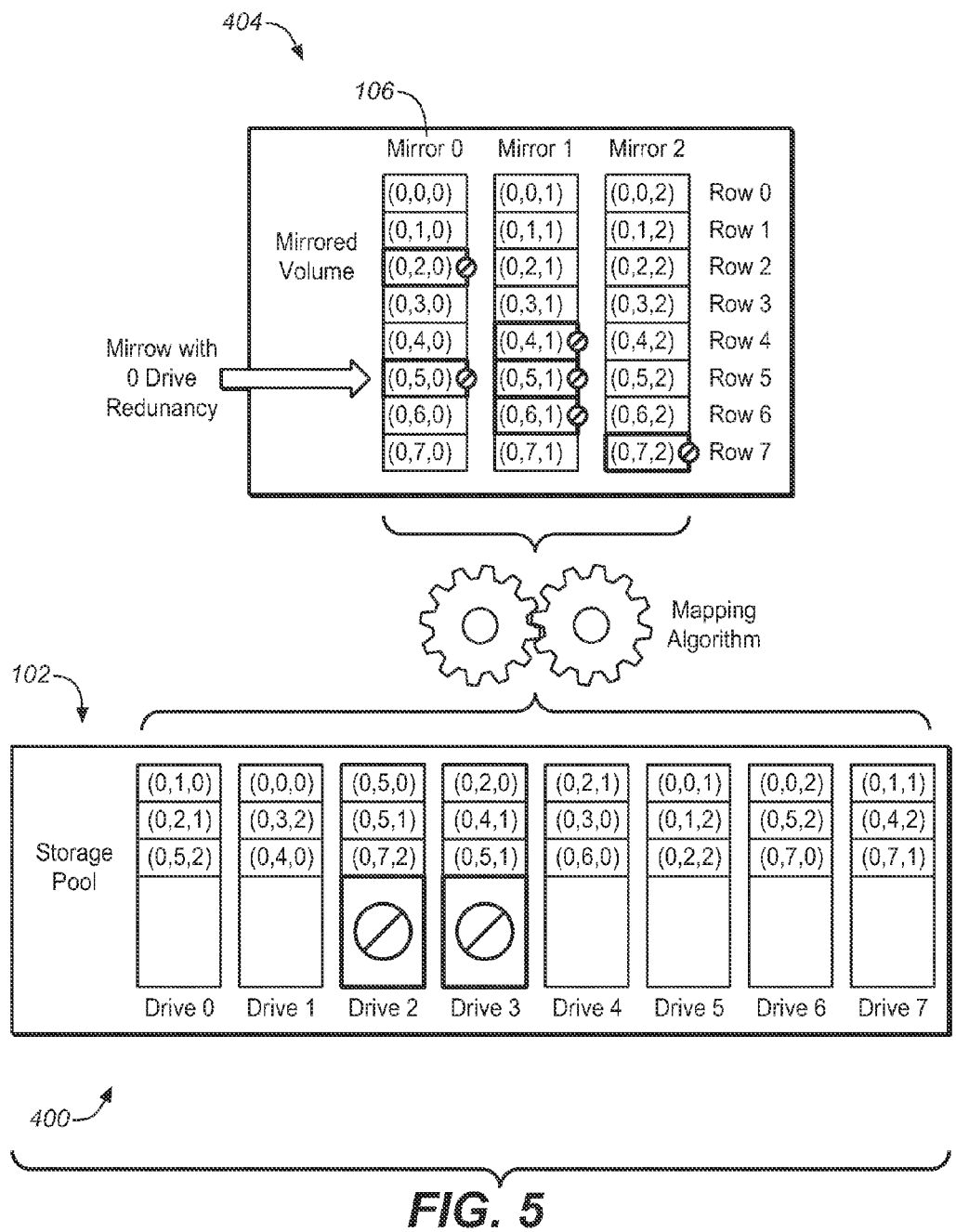
FIG. 5 is exemplary embodiment of a Distributed Mirror Data Layout illustrated in FIG. 4 depicting two storage device failures.

FIG. 5 illustrates a scenario where storage devices Drv2 and Drv3 fail. The data chunks stored on storage devices Drv2 and Drv3 may be lost due to the storage device 102 failure. The data slice associated with row 5 in the mirrored virtual volume 404 is at risk of being lost if another storage device 102 fails. Therefore, the prioritization module 210 may amend or create a reference to the data chunks associated with row 5 (DC (0,5,0) and DC (0,5,1)) at the top of the restoration list 208. The restoration module 212 may rebuild the data chunks to the plurality of storage devices 102 based upon the restoration list 208. Upon completion, the restoration module 212 may continue restoring any other data chunks with a reference included in the restoration list 208.

Figure 6:
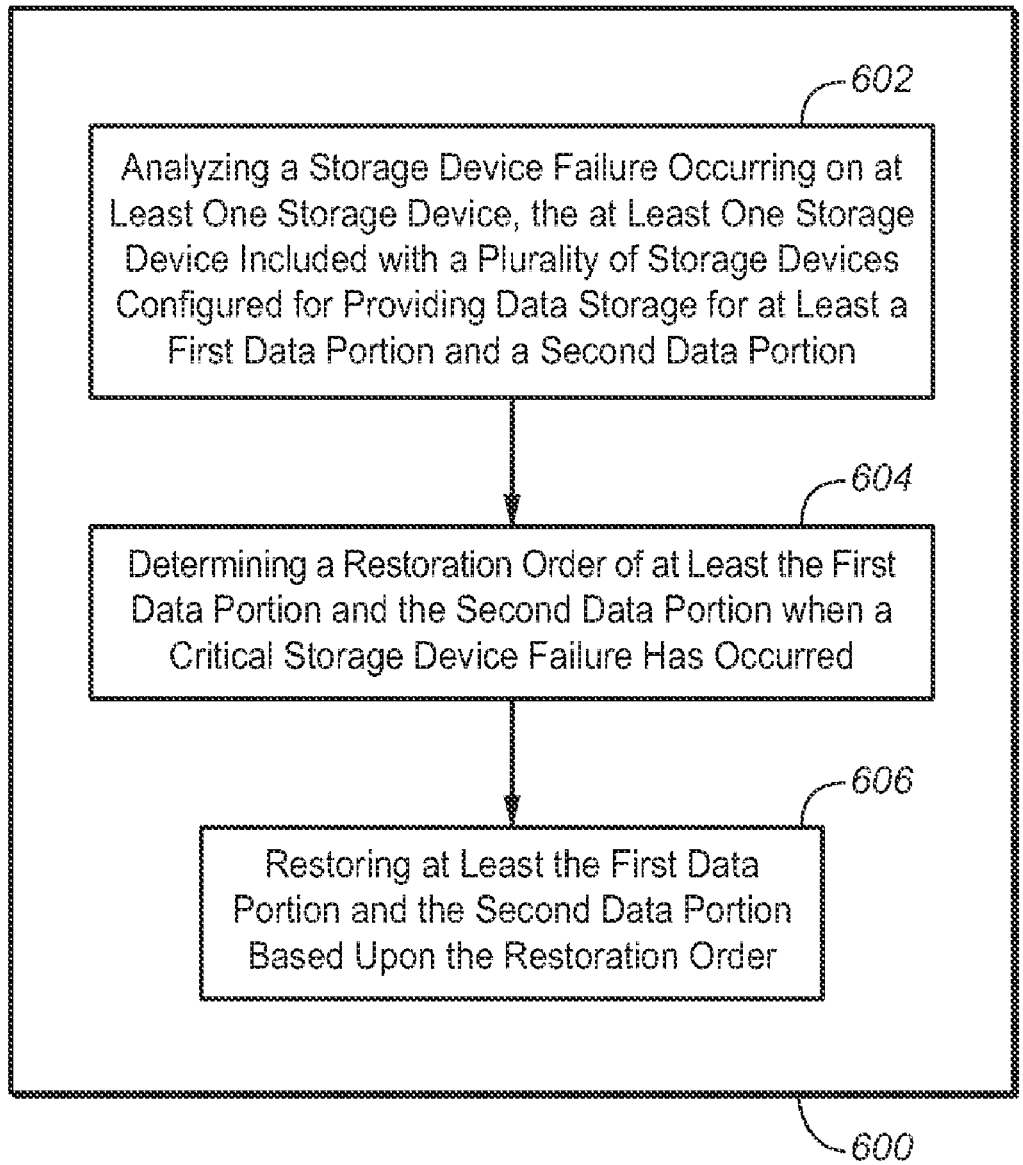
FIG. 6 is a flow diagram illustrating a method for restoring data stored on a plurality of storage devices.

Generally referring to FIG. 6, a method for restoring data stored on a plurality of storage devices is depicted. The method 600 may include analyzing a storage device failure occurring on at least one storage device, the at least one storage device included with a plurality of storage devices (Ex.—Drv0, Drv1, Drv2, Drv3, Drv4, Drv5, Drv6 and Drv7) configured for providing data storage for at least a first data portion (i.e. a data chunk) and a second data portion (i.e. a data chunk) 602. The method 600 may include determining a restoration order of at least the first data portion and the second data portion when a critical slice failure has occurred 604. The method 600 may include restoring at least the first data portion and the second data portion based upon the restoration order 606.

Figure 7:
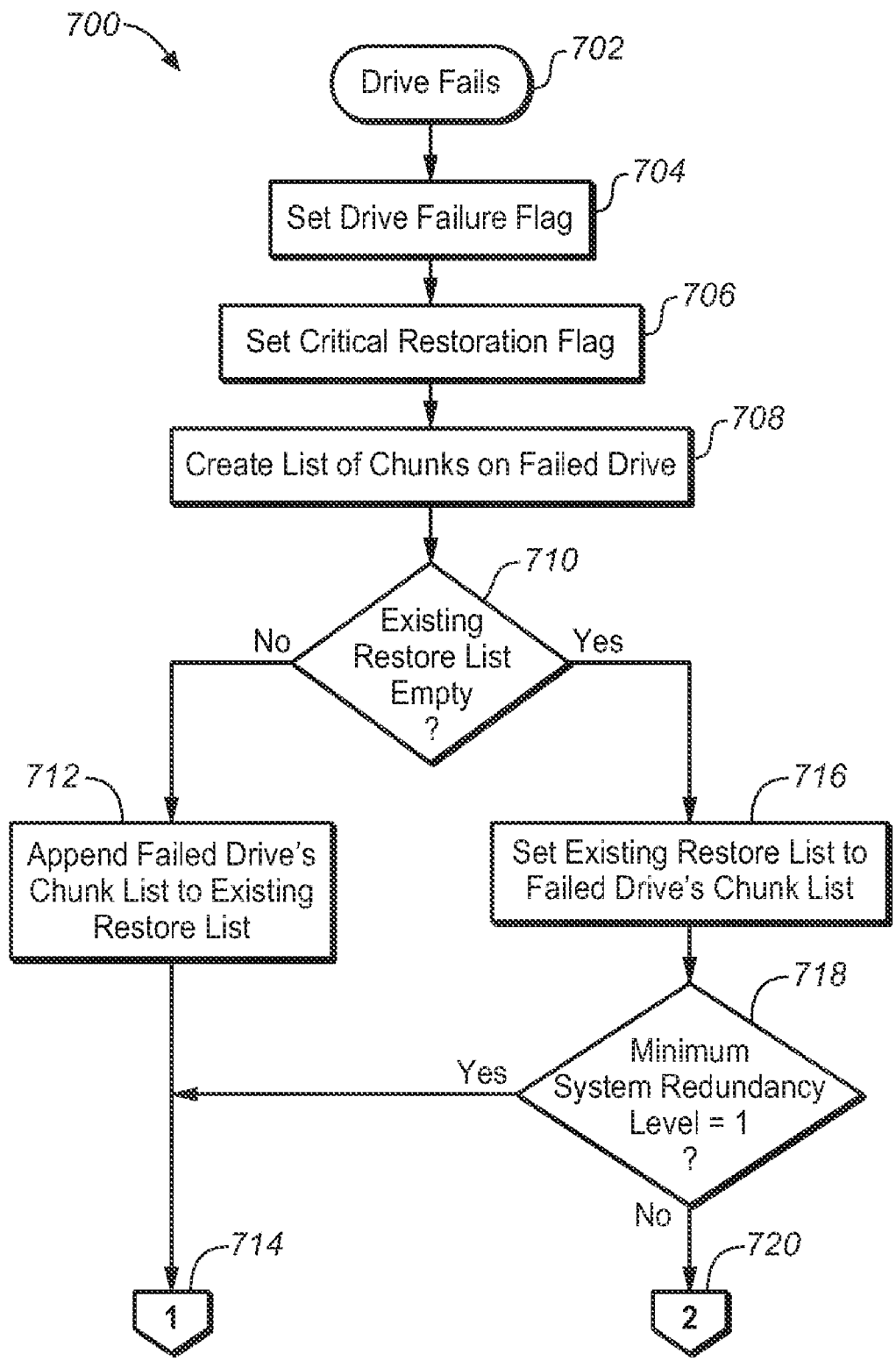
FIG. 7 is a flow diagram illustrating a method for drive failure characterization.

Generally referring to FIG. 7, a drive failure characterization method 700 for drive (storage device) failure characterization is depicted. The method 700 may utilize flags to control restoration methods (method 800 and method 900) and to control the restoration list 208. Alternatively, the method 700 may utilize work queues or signals instead of flags. The drive failure characterization method 700 starts when a drive (storage device 102) fails 702. A determination is made whether a drive failure potentially places data at risk when another drive fails. If there is no risk, a background restoration method 900 is entered. If there is potential risk, a critical restoration method 800 is entered followed by a background restoration method 900 after all critical restores are queued.

The drive failure flag 704 and critical restoration flag 706 are set. The drive failure flag terminates any critical restoration methods 800 from prior drive failures (prior storage device 102 failures) 812. The critical restoration flag terminates any background restoration methods 900 that were initiated from prior drive failures 914. Once the current drive failure has been characterized, a critical restoration method 800 or a background restoration method 900 is initiated. A list (restoration list 208 or restoration queue) of data chunks to restore from the newly failed drive is created 708. The restore list may be copied from storage system metadata. The restore list may also be created by running the mapping algorithm on all volumes being stored on the failed drive.

Next, a check is made to determine if there was a prior restoration in progress by checking if the restore list is empty 710. If the restore list is not empty, a previous restoration was underway. In this case, the drive failure is characterized as potentially critical, the chunk list from the newly failed drive is appended to the existing restore list 712 and a critical restoration method 800 is initiated 714. If the restore list is empty, no restoration was underway when the drive failed. In this case, the failed storage drive's data chunk list becomes the restore list 716. However, the drive failure has not yet been completely characterized.

The minimum redundancy level for all containers (volumes or objects) on the storage array (plurality of storage devices 102) is checked 718. If the minimum redundancy level is 1, a single drive failure must be treated as a critical failure; therefore, the critical restoration method 800 is entered 714. When no prior restoration was underway and the minimum redundancy level is greater than 1, all data is still protected so the drive failure can be handled using background restoration 720.

The critical restoration method 800 is entered after a drive failure has been categorized as potentially critical by the drive failure characterization method 700. The restore list is searched for cases where the set of failed drives contains multiple data chunks from the same volume and row. If the number of data chunks on a row is less than the volume's maximum redundancy, the restoration of those data chunks is left for the background restoration method 900. If the number of data chunks on a row is equal to the volume's maximum redundancy, a critical restoration is started on one chunk from that row. If the number of data chunks on a row is greater than the volume's maximum redundancy, a data loss has occurred and the volume is taken off line for further recovery.

Figure 8:
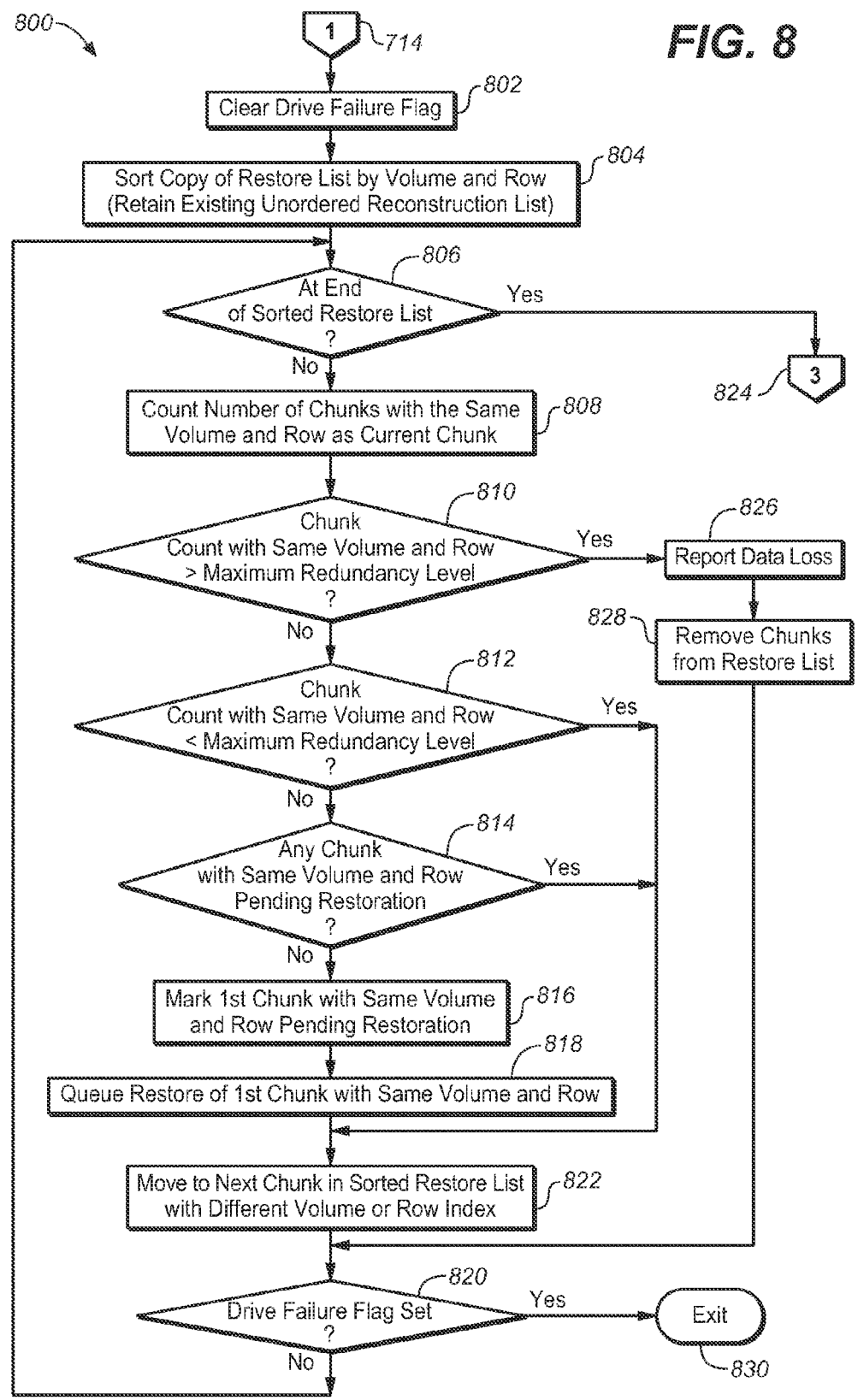
FIG. 8 is a flow diagram illustrating a critical restoration method.
Figure 9:
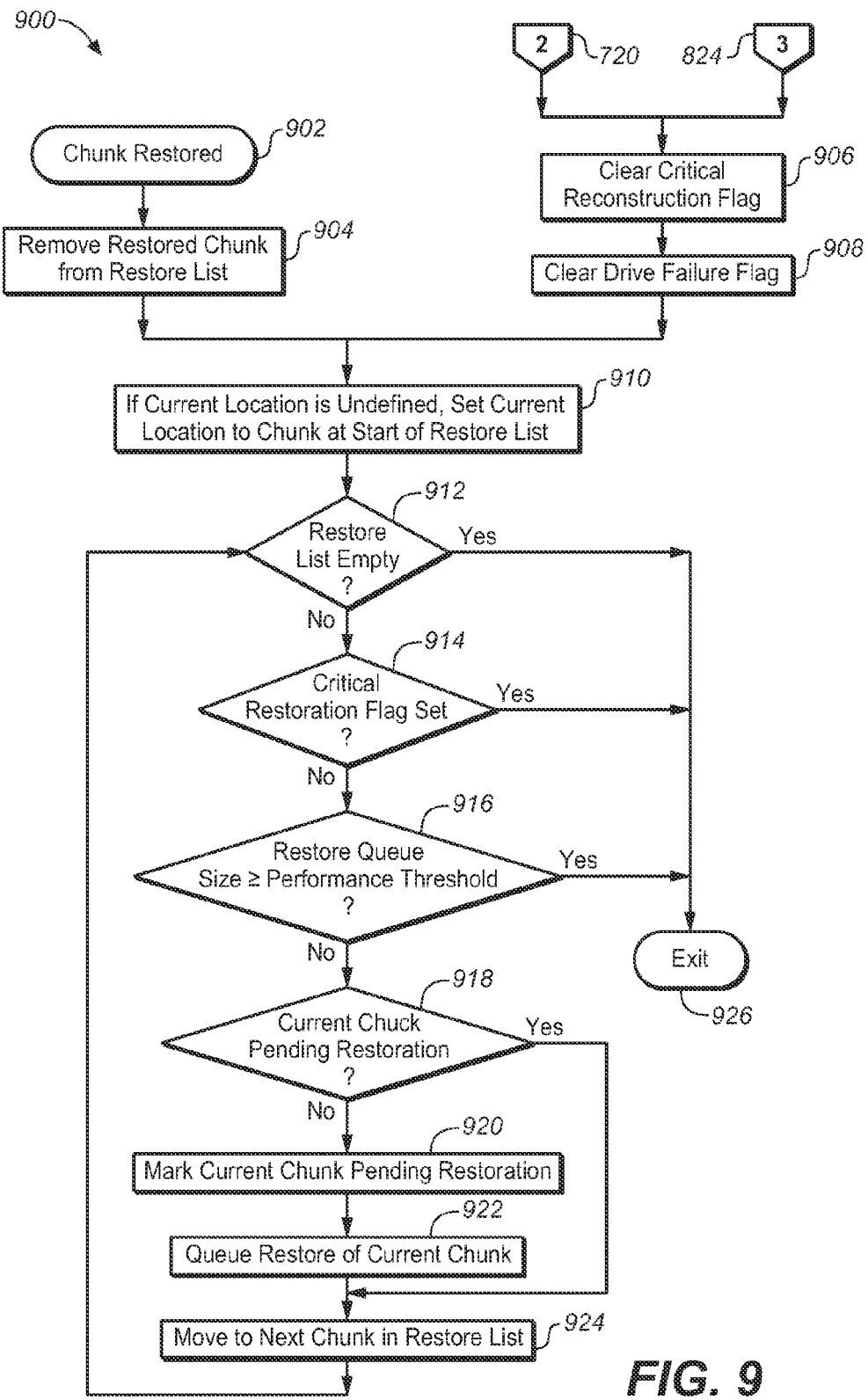
FIG. 9 is a flow diagram illustrating a background restoration method.

Generally referring to FIG. 8, a background restoration method 800 is depicted. The drive failure flag is cleared 802. A copy of the restore list sorted on volume and row is created 804. The sorted restore list is then walked by row until its end 806. For each row, a count is made of the number of data chunks on failed drives in the row 808. If the row's data chunk count exceeds the volume's maximum redundancy level 810 a data loss event is reported 826. A failed volume is taken off line during the report so its chunks are removed from the restore list 828. If the row's data chunk count is less than the volume's maximum redundancy level 812, restoration for all data chunks in the row is skipped by moving over them in the restore list 822. Otherwise, the row's data chunk count was equal to the volume's maximum redundancy level making data in that row at risk.

A check is made on all data chunks in the row to see if any are currently pending restoration 814. If any of the data chunks are queued for restore, all data chunks in the row are skipped by moving over them in the restore list 822. Otherwise, at least one data chunk for the row must be restored as a critical restoration. The first data chunk in the row is queued for critical restore 818 and the data chunk is marked as pending restoration 816. Finally, all remaining data chunks in the row are skipped by moving over them in the restore list 822.

Next, checks are made to determine if more critical restores should be queued. The drive failure flag is checked to determine if a new drive failure has occurred 820. Note that an additional drive failure does not imply data loss since it may only contain data chunks from rows with at least single drive redundancy. If drive failure flag is set, the current critical restoration method 800 is terminated so the next restoration method 800 can start with the added data chunks from the newly failed drive 830. The end of list condition is checked on the restore list 806. If the end of list has been reached, i.e., all rows with critical restorations have been located, the critical restoration method 800 ends and the background restoration method 900 begins 824.

The background restoration method 900 is entered after all critical restores have been queued. In background restoration, system performance takes precedence over restore because data is no longer at risk. In background restoration the restore list is processed in the order in which drives failed. When a maximum number of restores are queued, the method 900 suspends. The method 900 is restarted after each restore is completed so additional restores may be queued until the restore list is completely processed. The limit on queued restores can be changed at any time to control the amount of system performance allocated to background restoration.

Initially, a background recovery method 900 begins at the end of the drive failure characterization method 720 or at the end of a critical restoration method 824. In either of these cases, the critical restoration flag 906 and the driver failure flag 908 are cleared. The background restoration method 900 is restarted when a previously queued restore completes 902. In this case, the restored data chunk is removed from the restore list 904.

If the current location in the restore list is undefined, the current location is set to the head of the list 910. The background restoration method 900 then loops through the restore list queuing restores until one of the following conditions is met: (1) If the restore list is empty 912, the method 900 is complete and may exit 926; or (2) If the critical restoration flag is set 914, a new drive has failed so the current background restoration method 900 should exit 926. If the restore queue exceeds the performance threshold 916, queuing additional restores would adversely effect system performance, therefore, the current method 900 is suspended or exited 926. If a restore can be queued, a final check is made to determine if the current data chunk is already pending restoration 918. If the current data chunk is already pending restoration, it is skipped. If the data chunk is not being restored, it is marked pending restoration 920 and queued for restore 922. The current position in the restore list is then moved past the current data chunk and the process repeats 924.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for restoring data stored on a plurality of storage devices, comprising:
   mapping addresses of one or more physical storage devices to one or more virtual volume data chunks of a virtual redundant array of independent disks (RAID);
   generating a restoration list including one or more virtual volume data chunks mapped to one or more failed physical storage devices;
   prioritizing the restoration list according to one or more virtual slice redundancy levels of one or more virtual data slices of the virtual RAID including the one or more virtual volume data chunks mapped to the one or more failed physical storage devices; and
   reconstructing data of the one or more virtual volume data chunks mapped to the one or more failed physical storage devices to at least one replacement physical storage device according to the restoration list.

2. The method of claim 1, the virtual RAID having a number of virtual drives less than a number of the physical storage devices.

3. The method of claim 1, wherein the generating a restoration list including one or more virtual volume data chunks mapped to one or more failed physical storage devices comprises:
   copying from metadata a list of references to data chunks stored on the one or more failed physical storage devices.

4. The method of claim 1, wherein the generating a restoration list including one or more virtual volume data chunks mapped to one or more failed physical storage devices comprises:
   applying a mapping algorithm associated with mapping of one or more addresses of one or more physical storage devices to one or more virtual volume data chunks of the virtual RAID to determine which data chunks of the virtual RAID were stored on the one or more failed physical storage devices.

5. A method for restoring data stored on a plurality of storage devices, comprising:
   mapping addresses of one or more physical storage devices to one or more virtual volume data chunks of a virtual redundant array of independent disks (RAID);
   generating a restoration list including one or more virtual volume data chunks mapped to one or more failed physical storage devices;
   prioritizing the restoration list according to one or more virtual slice redundancy levels of one or more virtual data slices of the virtual RAID including the one or more virtual volume data chunks mapped to the one or more failed physical storage devices, wherein the prioritizing the restoration list according to one or more virtual slice redundancy levels of one or more virtual data slices of the virtual RAID including the one or more virtual volume data chunks mapped to the one or more failed physical storage devices comprises:
   comparing a number of virtual volume data chunks of a first virtual slice associated with the one or more failed physical storage devices to a number of virtual volume data chunks of a second virtual slice, and assigning at least one virtual volume chunk of a virtual volume slice having a greatest number of virtual volume data chunks associated with the one or more failed physical storage devices a highest priority in the restoration list; and reconstructing data of the one or more virtual volume data chunks mapped to the one or more failed physical storage devices to at least one replacement physical storage device according to the restoration list.

6. The method of claim 1, wherein the one or more virtual volume data chunks of the virtual RAID form a mirrored virtual volume.

7. A hardware system for restoring data stored on a plurality of storage devices, comprising:

means for mapping addresses of one or more physical storage devices to one or more virtual volume data chunks of a virtual redundant array of independent disks (RAID);

means for generating a restoration list including one or more virtual volume data chunks mapped to one or more failed physical storage devices;

means for prioritizing the restoration list according to one or more virtual slice redundancy levels of one or more virtual data slices of the virtual RAID including the one or more virtual volume data chunks mapped to the one or more failed physical storage devices; and means for reconstructing data of the one or more virtual volume data chunks mapped to the one or more failed physical storage devices to at least one replacement physical storage device according to the restoration list.

8. A non-transitory computer readable storage medium including instructions for executing a process on a computing device, the process comprising:

mapping addresses of one or more physical storage devices to one or more virtual volume data chunks of a virtual redundant array of independent disks (RAID);

generating a restoration list including one or more virtual volume data chunks mapped to one or more failed physical storage devices;

prioritizing the restoration list according to one or more virtual slice redundancy levels of one or more virtual data slices of the virtual RAID including the one or more virtual volume data chunks mapped to the one or more failed physical storage devices; and reconstructing data of the one or more virtual volume data chunks mapped to the one or more failed physical storage devices to at least one replacement physical storage device according to the restoration list.

* * * * *